United States Patent

Hayashi et al.

[11] Patent Number: 5,856,428
[45] Date of Patent: Jan. 5, 1999

[54] CRYSTALLINE AROMATIC POLYAMIDE RESIN COMPOSITION

[75] Inventors: Ryuichi Hayashi, Tokyo, Japan; Reiko Koshida, Parkersburg, W. Va.

[73] Assignee: E. I. du Pont de Nemours and Company, Wilmington, Del.

[21] Appl. No.: 720,603

[22] Filed: Oct. 1, 1996

[51] Int. Cl.$^6$ .............................. C08L 77/10; C08G 69/26
[52] U.S. Cl. .................... 528/332; 528/310; 528/322; 528/335; 528/336; 528/340; 528/349; 524/600; 524/607; 524/606
[58] Field of Search .................................. 524/600, 606, 524/607; 528/310, 322, 336, 340, 349, 332, 335

[56] References Cited

U.S. PATENT DOCUMENTS

| | | | |
|---|---|---|---|
| 4,495,328 | 1/1985 | Poppe et al. | 524/607 |
| 4,617,342 | 10/1986 | Poppe et al. | 524/607 |
| 5,194,578 | 3/1993 | Anton | 528/349 |

FOREIGN PATENT DOCUMENTS

| | | | |
|---|---|---|---|
| 07053715 A 950228 | 2/1995 | Japan . | |
| 07216223 A 950815 | 8/1995 | Japan . | |

Wo 94/25530  11/1994  WIPO .

*Primary Examiner*—P. Hampton-Hightower
*Attorney, Agent, or Firm*—P. Michael Walker; William H. Hamby

[57] ABSTRACT

An aromatic polyamide resin composition composed of two types of aromatic polyamide (A) and (B), where (A) is an aromatic polyamide wherein the molar ratio of aromatic polyamide with respect to the monomer components that constitute the polyamide is 0.4 or greater, and (B) is an aromatic polyamide containing an aromatic monomer as the monomer component that constitutes the polyamide and has a recrystallization temperature that is lower than that of the aromatic polyamide (A), where said aromatic polyamide resin composition has a recrystallization temperature that is 10° C. or more lower than the recrystallization temperature of the aromatic polyamide (A).

Merit:

The aromatic polyamide composition of the present invention has the high heat resistance characteristic of aromatic polyamides, superior dimensional stability with respect to water absorption, and maintenance of physical stability and chemical resistance, while providing improved molding characteristics.

6 Claims, No Drawings

CRYSTALLINE AROMATIC POLYAMIDE RESIN COMPOSITION

DETAILED DESCRIPTION

1. Industrial Application Field

The present invention concerns an aromatic polyamide resin composition, and in additional detail, concerns an aromatic polyamide resin composition with improved molding properties and high crystallinity which is produced by lowering the recrystallization temperature of an aromatic polyamide with a high recrystallization temperature.

2. Prior Art

Aromatic polyamides are known to have superior heat resistance and mechanical characteristics in comparison to aliphatic polyamides. The high glass transition temperature of aromatic polyamides is important because it provides high-temperature rigidity, but the crystallization rate is slow due to this high glass transition temperature; thus, there are cases in which crystallization in the molded article is incomplete under given molding conditions. When cooling occurs with incomplete crystallization, warping occurs in the molded articles, and there are also problems with fragility. For example, when an aromatic polyamide composed of hexamethylenediamine as the diamine component and a 7:3 mixture of terephthalic acid and isophthalic acid as the carboxylic acid component is subjected to molding at a low mold temperature of about 100° C., an amorphous layer is produced at the surface of the molded article, and the molded article experiences stress cracking when it comes into contact with solvents. In order to obtain molded articles without this problem, it is necessary to carry out molding at a high temperature before annealing, but this lengthens the molding cycle and decreases productivity.

The present inventors, in order to solve these problems, developed a polyamide resin composition wherein an aliphatic polyamide is contained in an aromatic polyamide (Japanese Patent Application No. Hei 6[1994]-6937). This aromatic polyamide resin composition had an improved crystallization rate and flow characteristics due to the presence of the aliphatic polyamide, and the material was appropriate for use in electrical and electronic parts and automotive parts.

Problems To Be Solved By The Invention

However, due to the presence of the aliphatic polyamide, problems with loss of characteristics of aromatic polyamides occurred, such as loss of the superior dimensional stability accompanying absorption of water, superior stability of mechanical characteristics and excellent chemical resistance. As a result, the uses of the resin composition were limited.

The objective of the present invention is to offer a crystalline aromatic polyamide composition that has the high heat resistance characteristic of aromatic polyamides and superior dimensional stability with respect to water absorption, while maintaining physical stability and chemical resistance and providing improved molding characteristics.

Means To Solve The Problems

The present inventors, as a result of painstaking investigations towards achieving the objectives described above, arrived at the present invention upon discovering that a crystalline aromatic polyamide resin composition that has the high heat resistance, the dimensional stability under water absorption, and the excellent physical stability and chemical resistance characteristic of aromatic polyamides, while offering improved molding properties, could be obtained by means of blending, in specific configurations, an aromatic polyamide (A) consisting of a determinate molar ratio of an aromatic monomer in the monomer component that constitutes the polyamide and an aromatic polyamide (B) having a recrystallization temperature that is lower than that of the aromatic polyamide (A).

Specifically, the present invention is an aromatic polyamide resin composition composed of two types of aromatic polyamide (A) and (B), where (A) is an aromatic polyamide wherein the molar ratio of aromatic polyamide with respect to the monomer components that constitute the polyamide is 0.4 or greater, and (B) is an aromatic polyamide containing an aromatic monomer as the monomer component that constitutes the polyamide and has a recrystallization temperature that is lower than that of the aromatic polyamide (A), where said aromatic polyamide resin composition has a recrystallization temperature that is 10° C. or more lower than the recrystallization temperature of the aromatic polyamide (A).

In addition, the present invention is an aromatic polyamide resin composition composed of two types of aromatic polyamide (A) and (B), where (A) is an aromatic polyamide containing, with respect to the monomer components that constitute the polyamide, 0.4–0.5 mol % of an aromatic carboxylic acid consisting of terephthalic acid or a mixture of terephthalic acid and isophthalic acid, and (B) is an aromatic polyamide that contains, as a monomer component that constitutes the polyamide, an aromatic carboxylic acid consisting of terephthalic acid or a mixture of terephthalic acid and isophthalic acid and has a recrystallization temperature that is lower than that of the aromatic polyamide (A), where said aromatic polyamide resin composition has a recrystallization temperature that is 10° C. or more lower than the recrystallization temperature of the aromatic polyamide (A).

In addition, the present invention is an aromatic polyamide resin composition composed of two types of aromatic polyamide (A) and (B), where (A) is an aromatic polyamide wherein the carboxylic acid component is terephthalic acid or a mixture of terephthalic acid and isophthalic acid and the diamine component is hexamethylenediamine or a mixture of hexamethylenediamine and 2-methylpentamethylenediamine, and (B) is an aromatic polyamide whose carboxylic acid component is a mixture of terephthalic acid and adipic acid or a mixture of terephthalic acid, isophthalic acid and adipic acid whose diamine component is hexamethylenediamine and whose recrystallization temperature is lower than that of the aromatic polyamide (A), where said aromatic polyamide resin composition has a recrystallization temperature that is 10° C. or more lower than the recrystallization temperature of the aromatic polyamide (A).

Moreover, inorganic fillers can be added and blended with the aromatic polyamide resin compositions described above, and thus the present invention also concerns a crystalline aromatic polyamide resin composition wherein 10–240 parts by weight of an inorganic filler are added to 100 parts by weight of the aforementioned aromatic polyamide resin composition.

Moreover, halide flame-resistant agents can also be added and blended with any of the aforementioned aromatic polyamide resin compositions; thus, the present invention also concerns a crystalline aromatic polyamide resin composition wherein 10–100 parts by weight of a halide flame-resistant agent are added to 100 parts by weight of the aforementioned aromatic polyamide resin composition.

Moreover, impact-resistant agents can also be added and blended with any of the aforementioned aromatic polyamide resin compositions, and thus the present invention also concerns a crystalline aromatic polyamide resin composition wherein 1–70 parts by weight of an impact-resistant agent are added to 100 parts by weight of the aforementioned aromatic polyamide resin composition.

The aromatic polyamide (A) that is one of the components that constitutes the aromatic polyamide resin composition of the present invention is a polyamide composed of monomers, where an aromatic compound is contained in one or more of the monomer components such as diamine, dicarboxylic acid and/or aminocarboxylic acid, which aromatic monomer is contained in a molar ratio of 0.4 or greater with respect to the total amount of monomer.

The aromatic polyamide (B) that is the other component that constitutes the aromatic polyamide resin composition of the present invention is an aromatic polyamide wherein an aromatic compound is contained in one or more of the monomer compounds such as diamine, dicarboxylic acid and/or aminocarboxylic acid, and has a recrystallization temperature that is lower than the recrystallization temperature of the aromatic polyamide (A).

Examples of the aromatic monomer that is composed of the aromatic polyamide (A) and the aromatic polyamide (B) include aromatic diamines, for example, p-phenylenediamine, o-phenylenediamine, m-phenylenediamine, p-xylenediamine [sic] and m-xylenediamine, aromatic dicarboxylic acids, for example, terephthalic acid, isophthalic acid, phthalic acid, 2-methylterephthalic acid and naphthalenedicarboxylic acid, or aromatic aminocarboxylic acids, for example, p-aminobenzoic acid. These aromatic monomers may be used individually or in combinations of two or more types. Consequently, terephthalic acid or a mixture of terephthalic acid and isophthalic acid is appropriate for use.

It is necessary that the aromatic polyamide (A) contain an aromatic monomer in the amount of a molar ratio of 0.4 or greater with respect to the monomer components that constitute the polyamide. If this molar ratio is less than 0.4, the high heat resistance, superior dimensional stability and chemical resistance characteristic of the aromatic polyamide will not be obtained.

Examples of monomers other than the aromatic monomers mentioned above that may be contained in the aromatic polyamide (A) and (B) used in the present invention include aliphatic dicarboxylic acids, aliphatic alkylenediamines, alicyclic alkylenediamines and aliphatic aminocarboxylic acids.

Examples of the aforementioned aliphatic dicarboxylic acids include adipic acid, sebacic acid, azelaic acid and dodecanedioic acid, and these substances can be used individually or in combinations of two or more types. An appropriate substance is thus adipic acid.

The aliphatic alkylenediamine component referred to above may be linear or branched, and these substances may be used individually or in mixtures of two or more types. Specific examples of these aliphatic alkylenediamines include ethylenediamine, trimethylenediamine, tetramethylenediamine, pentamethylenediamine, hexamethylenediamine, 1,7-diaminoheptane, 1,8-diaminooctane, 1,9-diaminononane, 1,10-diaminodecane, 2-methylpentamethylenediamine and 2-ethyltetramethylenediamine.

Specific examples of the alicyclic alkylenediamine components referred to above include 1,3-diaminocyclohexane, 1,4-diaminocyclohexane, 1,3-bis(aminomethyl) cyclohexane, bis(aminomethyl)cyclohexane, bis(4-aminocyclohexyl)methane, 4,4'-diamino-3,3'-dimethyldicyclohexylmethane, isophoronediamine and piperazine. These substances may be used individually or in combinations of two or more types.

Specific examples of the aforementioned aminocarboxylic acid component include ε-aminocaproic acid and ω-aminoundecanoic acid.

The aromatic polyamide resin composition of the present invention is a crystalline aromatic polyamide resin composition which contains the aforementioned aromatic polyamide (A) and an aromatic polyamide (B) with a lower recrystallization temperature and which may contain other polyamides in addition to the aromatic polyamide (A) and (B).

The recrystallization temperature of the crystalline aromatic polyamide resin composition of the present invention must be lower than the recrystallization temperature of the aromatic polyamide (A) by 10° C. or more. If the temperature is lower by less than 10° C., the molding properties will improve, but the effect will not be very great.

The recrystallization temperature referred to herein refers to the peak temperature obtained by heating the polymer to above the fusion point and then quenching the fused polymer in liquid nitrogen and measuring the crystallization temperature using a differential scanning calorimeter.

In the present invention, a crystalline aromatic polyamide resin composition is offered that has improved molding properties in addition to a recrystallization temperature that is lower than that of the aromatic polyamide (A) by 10° C. or more. This composition is produced by using an aromatic polyamide (A) with a relatively high recrystallization temperature in comparison to aromatic polyamides, and selecting, based on the type of aromatic polyamide (A), an aromatic polyamide (B) with a comparatively low recrystallization temperature.

Stress cracking due to solvents occurs because of the formation of an amorphous layer in the molding surface when molding is carried out at a mold temperature of about 100° C. with aromatic polyamides composed of hexamethylenediamine as the diamine component and a 7:3 mixture of terephthalic acid and isophthalic acid as the carboxylic acid component. But when an aromatic polyamide composed of hexamethylenediamine as the diamine component and terephthalic acid and adipic acid as the carboxylic acid component is added to this polyamide, the recrystallization temperature is lowered, and an amorphous layer is not produced in the surface under the same molding conditions. As a result, stress cracking does not occur due to solvents. Moreover, a molding can be obtained that has little after shrinkage due to heat present after molding. The present invention involves maintaining the ratio of the aromatic monomer at a high level in the composition, and by this means, high heat resistance characteristic of aromatic polyamides, superior dimensional stability with respect to water absorption and maintenance of physical stability and chemical resistance can be achieved, while providing improved molding characteristics.

The following abbreviations are used in the following explanation of the specification of the invention.

| ABBREVIATION | MEANING |
| --- | --- |
| TA | Terephthalic acid |
| IA | Isophthalic acid |
| NA | 2,6-Naphthalenedicarboxylic acid |
| MPMD | 2-Methylpentamethylenediamine |
| ETMD | 2-Ethyltetramethylenediamine |
| pDA | p-Phenylenediamine |

-continued

| ABBREVIATION | MEANING |
|---|---|
| mXD | m-Xylylenediamine |
| pXD | p-Xylylenediamine |
| 6TA | Hexamethylene terephthalamide |
| 6IA | Hexamethylene isophthalamide |

The numerals denote the number of carbon atoms contained in the aliphatic monomer diamine or dicarboxylic acid, so 6 denotes hexamethylenediamine or adipic acid.

In addition, as shown in the table above, the aromatic monomers are expressed in terms of alphabetic designations.

The polyamides are denoted by two numerals or alphabetic designations, and thus 66 denotes polyhexamethylene adipamide, 612 denotes hexamethylenediamine and dodecanedioic acid polyamide, 6TA denotes hexamethylene terephthalamide, 6IA denotes hexamethylene isophthalamide, ETMD.TA denotes 2-ethyltetramethylenediamine and terephthalic acid polyamide.

[The symbol]/ denotes a copolymer, and thus 6TA/6IA denotes a copolymer of hexamethylene terephthalamide and hexamethylene isophthalamide. In addition, when the denominator of the "/" symbol or the molecule numeral is singular, the aliphatic aminocarboxylic acid is expressed as the number of carbon atoms contained therein. For example, 6 denotes ε-aminocaproic acid.

Although there are no particular limitations on the conditions pertaining to the combination of (A) and (B) in the aromatic polyamide resin composition of the present invention, it is necessary that (A) and (B) have some degree of mutual compatibility so that, by plasticizing (A) with (B), the composition of the present invention will have a recrystallization temperature that is lower than that of (A) by 10° C. or more.

For example, when 6TA/6IA, 6TA/6IA/66, 6TA/MPMD.TA, 6TA/MPMD.TA/6IA, 4TA/ETMD.TA or 4TA/DTA is used as (A), a composition with a lower recrystallization temperature than (A) is produced when (B) is 6TA/66, 6TA/610, 6TA/612, 6TA/6, 4TA/46 or 12TA/12.6. For example, the chemical resistance and high-temperature physical properties of (A) are not lost, and the recrystallization temperature can be decreased by 10° C. or more due to the aromatic monomer component when a polymer wherein the TA component is present in the amount of 30–60 mol % with respect to the dicarboxylic acid components is used with 6TA/66.

In addition, when 6NA/6, 6NA/6IA or 6NA/MPMD.NA is used as (A), 6TA/6, 6TA/66, 6TA/68 or 6TA/610 may be used as (B).

Moreover, nTA, nTA/nIA (where n denotes an integer such that 6<n<13) or PDAm (where m denotes an integer such that 5<m<13) may be used as (A). On the other hand, mXD.6, mXD.8, mXD.10, pXD.8, pXD.10 or pXD.12 is also effective when used as (B).

Various molding materials used in molded articles are appropriate for use as the crystalline aromatic polyamide resin composition of the present invention. An example of the crystalline aromatic polyamide resin composition of the present invention involves using an aromatic polyamide (A) wherein the carboxylic acid component is terephthalic acid or a mixture of terephthalic acid and isophthalic acid, and the diamine component is a mixture of hexamethylenediamine and 2-methylpentamethylenediamine and an aromatic polyamide (B) whose carboxylic acid component is a mixture of terephthalic acid and adipic acid, whose diamine component is hexamethylenediamine, and whose recrystallization temperature that is lower than the recrystallization temperature of the aromatic polyamide, where the recrystallization temperature of said aromatic resin composition is lower than the recrystallization temperature of the (A) aromatic polyamide by 10° C. or more. Such a composition is desirable for use as a component material for automotive parts. In addition, a composition produced by adding a halide flame-resistant agent is appropriate for use as a molding material for electrical and electronic parts. In addition, a material produced by adding an impact-resistant agent is appropriate for use in automotive and sports applications.

The method for manufacturing the crystalline aromatic polyamide resin composition of the present invention may be carried out by means of any conventional well-known method. For example, two types of aromatic polyamide may be mixed, kneaded and extruded using a biaxial extruder or other melt-kneader to form pellets, or a method may be used wherein two types of low-molecular aromatic polyamide are mixed and polymerized, or a method may be used wherein mixing and extrusion and polymerization are carried out simultaneously. Moreover, melting and kneading as well as molding may be carried out with an injection molder.

The crystalline aromatic polyamide resin composition of the present invention should contain 10–240 parts by weight of an inorganic filler with respect to 100 parts by weight of the aromatic polyamide resin composition. Examples of inorganic fillers include glass fiber, carbon fiber, potassium titanate, whiskers, talc and mica, but glass fiber is preferred. If the filler content is less than 10 parts by weight, the effect of improving the mechanical strength will not be seen, whereas if the content is greater than 240 parts by weight, the elongation will be lost. An appropriate content is thus 10–65 wt %.

In addition, 10–100 parts by weight of a halide flame-resistant agent may be added to 100 parts by weight of the aromatic polyamide. Examples of halide flame-resistant agents include polydibromostyrene, polytribromostyrene, polypentabromostyrene, brominated polystyrene, brominated epoxy compounds, octabromodiphenyl ether, decabromodiphenyl ether, brominated polyphenylene ether, polydichlorostyrene, polytrichlorostyrene and perchlorocyclopentadecane. Polystyrene systems that contain bromide are preferred flame-resistant agents. If the content is less than 10 parts by weight, the flame resistance effects will not be manifested, and if the content is greater than 100 parts by weight, there will be detrimental effects pertaining to mechanical properties. When a flame-resistant agent is used, good flame resistance can be produced by using a flame resistance auxiliary such as an antimony compound or metal hydroxide.

1–70 parts by weight of an impact-resistant agent can be added to 100 parts by weight of an aromatic polyamide resin composition. Elastomers are generally used as the impact-resistant agent, examples of which include elastomers composed of ethylene-α-olefins, elastomers composed of ethylene-propylene-diene, elastomers composed of graft-modified ethylene-propylene-dienes, elastomers composed of ethylene-unsaturated carboxylic acid or unsaturated carboxylic acid ester which have at least reactive, graft-modifiable unsaturated monomers, and elastomers composed of graft-modifiable ethylene-unsaturated carboxylic acid or unsaturated carboxylic acid ester. Elastomers composed of essentially ethylene-propylene-dienes that are modified with carboxylic acid or carboxylic anhydride or elastomers composed essentially of ethylene-acrylatemethacrylate-unsaturated epoxide are preferably used. Examples of elastomers composed essentially of ethylene-propylene-dienes modified with carboxylic acid or carboxylic anhydride include ethylene-propylene-1,4-hexadiene-g-maleic anhydride, mixtures of ethylene-propylene-1,4-hexadiene and ethylene-maleic anhydride, mixtures of ethylene-propylene-1,4-hexadiene and ethylene-propylene-1,4-hexadiene-g-maleic anhydride, ethylene-propylene-1,4-hexadiene-norbornadiene-g-maleic fumaric anhydride, ethylene-1,4-hexadiene-norbornadiene-g-maleic anhydride monoethyl ester, ethylene-propylene-1,4-hexadiene-norbornadiene-g-fumaric acid, mixtures of ethylene-propylene-1,4-hexadiene and ethylene-maleic anhydride monoethyl ester, mixtures of ethylene-propylene-1,4-hexadiene and ethylene-monobutyl maleate and mixtures of ethylene-propylene-1,4-hexadiene and ethylene-maleic anhydride. Examples of elastomers composed essentially of ethylene-acrylate-methacrylate-unsaturated epoxide include ethylene-methyl acrylate-glycidyl methacrylate, ethylene-butyl acrylate-glycidyl methacrylate; and ethylene-methyl methacrylate-glycidyl acrylate.

In addition, polyethylene, polypropylene and other polyolefins and copolymers and polyolefin copolymer ionomers thereof are appropriate for use as an impact-resistant agent. Preferable polyolefin copolymer ionomers are composed of ethylene units, α,β-ethylenically unsaturated carboxylic acid derivative units and ester units, and it is particularly desirable for the α,β-ethylenically unsaturated carboxylic acid derivative units to be one or more species selected from among α,β-ethylenically unsaturated carboxylic acids with 3–8 carbon atoms, monocarboxylic acids having carboxylic acid groups that are ionized by neutralization of [sic] a metal ion, or carboxylic acids having ester groups and carboxylic acid groups ionized by neutralization of a metal ion. In addition, substances wherein the ester units are acrylic acid ester or methacrylic acid ester units with 4–22 carbon atoms are used. One type or a mixture of two or more types of the aforementioned impact-resistant agent may be used, and the content thereof is 1–70 parts by weight, with 5–35 parts by weight being preferred. If this content is less than 1 part by weight, an improvement in impact resistance will not be seen, and if the content is greater than 70 parts by weight, the characteristics of the aromatic polyamide will be lost.

Additives such as thermal stabilizers, plasticizers, antioxidants, nucleating agents, dyes, pigments and mold-release agents may be blended with the aromatic polyamide composition of the present invention, provided that the characteristics are not lost.

EXAMPLES

The present invention is explained in detail below using application examples.

Polymers manufactured by DuPont were used for the aromatic polyamides shown in Table I.

TABLE I

|  | DICARBOXYLIC ACID | DIAMINE |
|---|---|---|
| Polymer A | TA 100 | HMD 50 |
|  |  | MPMD 50 |
| Polymer B | TA 100 | HMD 55 |
|  |  | MPMD 45 |
| Polymer C | TA 95 | HMD 50 |
|  | IA 5 | MPMD 50 |
| Polymer D | TA 55 | HMD 100 |
|  | AA 45 |  |

TABLE I-continued

|  | DICARBOXYLIC ACID | DIAMINE |
|---|---|---|
| Polymer E | TA 40 | HMD 100 |
|  | AA 60 |  |
| Polymer F | TA 33 | HMD 100 |
|  | AA 67 |  |

TA: Terephthalic acid
IA: Isophthalic acid
AA: Adipic acid
HMD: Hexamethylenediamine
MPMD: 2-Methylpentamethylenediamine The aromatic polyamides shown in Table II were melted and kneaded with a biaxial extruder (TEM 35, manufactured by Toshiba). After introducing the fused polymer into liquid nitrogen and quenching, the material was heated above its glass transition temperature, and the temperature at which the polymer recrystallized was measured with a differential scanning calorimeter. The recrystallization temperature (Tcc) was the exothermic peak temperature found at a temperature elevation of 10° C./min. ΔTcc is expressed as the difference between the Tcc of the aromatic polyamide (A) and the Tcc of the resin composition shown in the application examples or comparative examples. ΔHm is the endothermic peak surface area at a temperature elevation of 10° C./min. PA 66 in the table refers to nylon 66, manufactured by DuPont.

TABLE II

| | Aromatic polyamide | | | | | |
|---|---|---|---|---|---|---|
| | (A) | (B) | (A)/(B) | Tcc(°C.) | ΔTcc(°C.) | ΔHm (J/g) |
| Composition 1 | A | D | 80/20 | 153 | 17 | 40 |
| 2 | A | D | 50/50 | 138 | 32 | 37 |
| 3 | A | D | 25/75 | 121 | 49 | 34 |
| 4 | A | E | 50/50 | 98 | 72 | 27 |
| 5 | A | F | 67/33 | 146 | 26 | 40 |
| 6 | B | F | 67/33 | 142 | 25 | 43 |
| 7 | C | D | 50/50 | 142 | 34 | 35 |
| 8 | A |  | 100/0 | 170 | — | 40 |
| 9 | A | D | 90/10 | 163 | 7 | 38 |
| 10 | B |  | 100/0 | 167 | — | 46 |
| 11 | C |  | 100/0 | 176 | — | 28 |
| 12 |  | D | 0/100 | 100 | — | 42 |
| 13 | A | PA66 | 67/33 | 128 | 42 | 16 |
| 14 | A | PA66 | 60/40 | 120 | 50 | 17 |
| 15 | A | PA66 | 50/50 | 108 | 62 | 19 |

Application Examples 1–3,
Comparative Examples 1–2

The aromatic polyamides shown in Table III were fused and blended with glass fiber of diameter 10 μm as a filler using a biaxial extruder (TEM 35, manufactured by Toshiba). After cooling with water, the material was pelletized. The resulting pellets were used to mold test strips of 13 mm×130 mm×2 at a mold temperature of 100° C. The molded tests strips were allowed to stand for 3 h at 180° C., and the dimensional deformation was measured. The results are shown in Table III.

TABLE III

| | Aromatic Polyamide | | | Glass Fiber (%) | Dimensional Deformation Due to Heat Treatment (%) 180° C., 3 h |
|---|---|---|---|---|---|
| | (A) | (B) | A/B | | |
| Application Example 1 | A | D | 50/50 | 35 | 0.40 |
| Application Example 2 | A | F | 67/33 | 35 | 0.39 |
| Application Example 3 | B | F | 67/33 | 35 | 0.37 |
| Comparative Example 1 | A | | 100/0 | 35 | 0.59 |
| Comparative Example 2 | B | | 100/0 | 35 | 0.44 |

It was clear that the dimensional deformation due to the heat treatment was improved by means of lowering the recrystallization temperature using two types of aromatic polyamide.

Application Examples 4–5.
Comparative Examples 3–5

The aromatic polyamides shown in Table IV were fused and kneaded along with glass fiber of diameter 10 μm as a filler using a biaxial extruder (TEM 35, manufactured by Toshiba). After cooling the material was pelletized. The resulting pellets were used to mold 75 mm×125 mm×3.2 mm test strips at a mold temperature of 120° C. After allowing the molded test strips to stand for 24 h at 160° C., the dimensional stability and external appearance were observed. In addition, the tensile modulus was measured under absolutely dry conditions and at 100% relative humidity. The retention ratio was used as a measure of rigidity retention. The anti-LCC (long-life current) characteristics of the test strips were also measured. Specifically, the test strips were immersed for 500 h in a 50% ethylene glycol solution at 130° C., and after allowing to stand at room temperature, the tensile strength was measured following ASTM D638. The results are shown in Table IV.

It was clear, from a comparison of the application examples and Comparative Example 3, that the external appearances of the moldings were superior. Although the dimensional deformation due to the heat treatment was improved in Comparative Example 5 by lowering the recrystallization temperature using an aromatic polyamide and an aliphatic polyamide in conjunction, the rigidity retention and anti-LCC characteristics deteriorated.

Application Example 6 and Comparative Examples 6–8

The aromatic polyamides shown in Table V were fused and kneaded along with glass fiber of diameter 10 μm as a filler and brominated polystyrene as a flame-resistant agent using a biaxial extruder (TEM 35, manufactured by Toshiba). After cooling, the material was pelletized. The resulting pellets were used to mold 13 mm×130 mm×0.8 mm test strips at a mold temperature of 120° C. After allowing the molded test strips to stand for 2 h at 160° C., the dimensional deformation was determined. In addition, the dimensional deformation was determined after standing for 24 h in water at 50° C. The results are shown in Table V.

TABLE IV

| | Aromatic Polyamide | | | Glass Fiber (%) | Dimensional Deformation Due to Heat Treatment (%) | Change in Luster | Rigidity Retention (%) | Anti-LLC (kgf/cm²) |
|---|---|---|---|---|---|---|---|---|
| | (A) | (B) | A/B | | | | | |
| Application Example | | | | | | | | |
| 4 | A | D | 80/20 | 35 | 0.11 | Somewhat reduced | 84 | 1430 |
| 5 | A | D | 50/50 | 35 | 0.09 | No change | 77 | 1110 |
| Comparative Example | | | | | | | | |
| 3 | A | | 100/0 | 35 | 0.35 | Greatly reduced | 93 | 1630 |
| 4 | | D | 0/100 | 35 | 0.04 | No change | 53 | 420 |
| 5 | A | PA66 | 50/50 | 35 | 0.06 | No change | 44 | 630 |

TABLE V

| | Aromatic Polyamide | | | Glass Fiber | Flame-resistant Agent | Dimensional Deformation Due to Heat | Dimensional Deformation Due to Water |
|---|---|---|---|---|---|---|---|
| | (A) | (B) | A/B | (%) | (%) | Treatment (%) | Absorption |
| Application Example | | | | | | | |
| 6 | A | D | 50/50 | 30 | 21 | 0.29 | 0.49 |
| Comparative Example | | | | | | | |
| 6 | A | | 100/0 | 30 | 21 | 0.49 | 0.40 |
| 7 | | D | 0/100 | 30 | 21 | 0.09 | 0.70 |
| 8 | A | PA66 | 67/33 | 30 | 21 | 0.49 | 0.39 |

From Application Example 6 and Comparative Examples 6 and 7, it is clear that the resin compositions of the present invention had improved dimensional stability under heat treatment while exhibiting reduced dimensional deformation due to water absorption.

Application Example 7 and Comparative Examples 9–10

The aromatic polyamides shown in Table VI were fused and kneaded along with glass fiber of diameter 10 μm as a filler and kaolin using a biaxial extruder (TEM 35, manufactured by Toshiba). After cooling the material was pelletized. The resulting pellets were used to mold 13 mm×130 mm×4 mm test strips at a mold temperature of 150° C. After allowing the molded test strips to stand for 3 h at 180° C., the dimensional deformation was determined. In addition, the deflection temperature under load was determined according to ASTM D648 under a load of 18.6 kg/cm². The results are shown in Table VI.

perature is lowered by using two types of aromatic polyamide. In addition, Application Example 7 and Comparative Example 10 make clear that, although the recrystallization temperature is lowered by using an aromatic polyamide and an aliphatic polyamide in conjunction, the deflection temperature under load is not maintained.

Application Example 8 and Comparative Examples 11–12

The aromatic polyamides shown in Table VII were fused and kneaded along with ethylene propylene copolymer (EPR) modified with maleic anhydride as an impact-resistant agent using a biaxial extruder (TEM 35, manufactured by Toshiba). After cooling, the material was pelletized. The resulting pellets were used to mold 13 mm×115 mm×1 mm test strips at a mold temperature of 40° C. After allowing the molded test strips to stand for 2 h at 160° C.,

TABLE VI

| | Aromatic Polyamide | | | Filler (%) | | Dimensional Deformation Due to Heat Treatment | Deflection Temperature Under Load (°C.) |
|---|---|---|---|---|---|---|---|
| | (A) | (B) | A/B | Glass | Kaolin | (%) | (18.6 kg/cm²) |
| Application Example 7 | A | D | 50/50 | 10 | 40 | 0.06 | 234 |
| Comparative Example 9 | A | | 100/0 | 10 | 40 | 0.11 | 234 |
| Comparative Example 10 | A | PA66 | 50/40 | 10 | 40 | 0.06 | 213 |

It is clear from Application Example 7 and Comparative Example 9 that the dimensional deformation due to heat treatment is reduced while maintaining an excellent deflection temperature under load when the recrystallization temthe dimensional deformation was determined. In addition, the deflection temperature under load was determined according to ASTM D648 under a load of 18.6 kg/cm². The results are shown in Table VII.

TABLE VII

| | Aromatic Polyamide | | | Impact Resisting Agent EPR | Dimensional Deformation Due to Heat Treatment | Deformation Temperature Under Load (°C.) |
|---|---|---|---|---|---|---|
| | (A) | (B) | A/B | (%) | (%) | (18.6 kg/cm²) |
| Application Example 8 | A | D | 50/50 | 15 | 1.0 | 115 |
| Comparative | A | | 100/0 | 15 | 6.1 | 130 |

TABLE VII-continued

|  | Aromatic Polyamide | | | Impact Resisting Agent EPR (%) | Dimensional Deformation Due to Heat Treatment (%) | Deformation Temperature Under Load (°C.) (18.6 kg/cm²) |
| --- | --- | --- | --- | --- | --- | --- |
|  | (A) | (B) | A/B |  |  |  |
| Example 11 |  |  |  |  |  |  |
| Comparative Example 12 | A | PA66 | 67/33 | 15 | 2.7 | 106 |

The recrystallization temperature was reduced even when an impact-resistant agent was used, and the deflection temperature under load was low in each ease. However, it was clear from Application Example 8 and Comparative Example 12 that the use of two types of aromatic polyamide allowed the maintenance of a high deflection temperature under load.

EFFECT OF THE INVENTION

As has been described above, the aromatic polyamide composition of the present invention has the high heat resistance characteristic of aromatic polyamides, superior dimensional stability with respect to water absorption, and maintenance of physical stability and chemical resistance, while providing improved molding characteristics.

What is claimed is:

1. An aromatic polyamide resin composition composed of two types of aromatic polyamides (A) and (B), where (A) is an aromatic polyamide comprised of aromatic and aliphatic or alicyclic monomers wherein the molar ratio of aromatic monomer to the monomer components is 0.4 or greater, and (B) is an aromatic polyamide containing an aromatic monomer as the monomer component that constitutes the polyamide and has a recrystallization temperature that is lower than that of aromatic polyamide (A), where said aromatic polyamide resin composition has a recrystallization temperature that is 10° C. or more lower than the recrystallization temperature of the aromatic polyamide (A).

2. An aromatic polyamide resin composition composed of two types of aromatic polyamides (A) and (B), where (A) is an aromatic polyamide containing aromatic and aliphatic or alicyclic monomer components, wherein the molar ratio of aromatic monomer components to the monomer components is 0.4–0.5 and said aromatic monomer is an aromatic carboxylic acid consisting of terephthalic acid or a mixture of terephthalic acid and isophthalic acid, and (B) is an aromatic polyamide containing an aromatic monomer that contains, as a monomer component that constitutes the polyamide, an aromatic carboxylic acid consisting of terephthalic acid or a mixture of terephthalic acid and isophthalic acid, and has a recrystallization temperature that is lower than that of aromatic polyamide (A), where said aromatic polyamide resin composition has a recrystallization temperature that is 10° C. or more lower than the recrystallization temperature of aromatic polyamide (A).

3. An aromatic polyamide resin composition composed of two types of aromatic polyamide (A) and (B), where (A) is an aromatic polyamide having a carboxylic acid component comprised of terephthalic acid or a mixture of terephthalic acid and isophthalic acid and a diamine component comprised of hexamethylenediamine or a mixture of hexamethylenediamine and 2-methylpentamethylenediamine, and (B) is an aromatic polyamide having a carboxylic acid component comprised of a mixture of terephthalic acid and adipic acid or a mixture of terephthalic acid, isophthalic acid and adipic acid, and hexamethylenediamine as a diamine component, and having a recrystallization temperature that is lower than that of aromatic polyamide (A), where said aromatic polyamide resin composition has a recrystallization temperature that is 10° C. or more lower than the recrystallization temperature of aromatic polyamide (A).

4. A crystalline aromatic polyamide resin composition wherein 10–240 parts by weight of an inorganic filler are contained in 100 parts by weight of the aromatic polyamide resin composition claimed in claims 1, 2 or 3.

5. A crystalline aromatic polyamide resin composition wherein 10–100 parts by weight of a halide flame-resistant agent are contained in 100 parts by weight of the aromatic polyamide resin composition described in claims 1, 2 or 3.

6. A crystalline aromatic polyamide resin composition, wherein 1–70 parts by weight of an impact-resistant agent are contained in 100 parts by weight of the aromatic polyamide resin composition claimed in claims 1, 2 or 3.

* * * * *